US007019614B2

(12) United States Patent
Lavelle et al.

(10) Patent No.: US 7,019,614 B2
(45) Date of Patent: Mar. 28, 2006

(54) DOOR SECURITY SYSTEM AUDIT TRAIL

(75) Inventors: Gary E. Lavelle, Avon, CT (US); Peter S. Conklin, South Burlington, VT (US)

(73) Assignee: Harrow Products, Inc., Montvale, NJ (US)

( * ) Notice: Subject to any disclaimer, the term of this patent is extended or adjusted under 35 U.S.C. 154(b) by 312 days.

(21) Appl. No.: 10/244,999

(22) Filed: Sep. 17, 2002

(65) Prior Publication Data

US 2003/0071715 A1 Apr. 17, 2003

Related U.S. Application Data

(63) Continuation of application No. 08/893,973, filed on Jul. 16, 2005, now abandoned, which is a continuation of application No. 08/384,771, filed on Feb. 7, 1995, now abandoned.

(51) Int. Cl.
*G06F 7/04* (2006.01)

(52) U.S. Cl. .................... 340/5.5; 340/5.22; 340/5.33; 340/5.28; 70/278.2

(58) Field of Classification Search ................ 340/5.5, 340/5.22, 5.24, 5.33, 5.25, 5.42, 5.65, 5.28; 235/380, 382, 382.5; 70/278.2
See application file for complete search history.

(56) References Cited

U.S. PATENT DOCUMENTS

| | | | | |
|---|---|---|---|---|
| 3,622,991 | A | | 11/1971 | Lehrer et al. |
| 4,659,914 | A | | 4/1987 | Kondo et al. |
| 4,717,816 | A | | 1/1988 | Raymond et al. |
| 4,721,954 | A | * | 1/1988 | Mauch ...................... 340/5.54 |
| 4,789,859 | A | | 12/1988 | Clarkson et al. |
| 4,811,012 | A | | 3/1989 | Rollins |
| 4,839,640 | A | | 6/1989 | Ozer et al. |
| 4,937,560 | A | | 6/1990 | Nourmand |
| 5,083,122 | A | | 1/1992 | Clark |
| 5,422,634 | A | | 6/1995 | Okubo |
| 5,823,027 | A | * | 10/1998 | Glick et al. ............... 70/278.2 |

* cited by examiner

*Primary Examiner*—Edwin C. Holloway, III

(74) *Attorney, Agent, or Firm*—Michael Best & Friedrich LLP

(57) ABSTRACT

A door security system for a door having an electrically actuated lock. The lock is controlled by a lock controller having an audit trail memory. An entry code reader transmits entered access codes to the controller. The controller compares the entered access code to prestored access codes and actuates the lock in response to the comparison. The controller stores the entered access code and a time stamp in the audit trail memory.

18 Claims, 17 Drawing Sheets

DOOR SECURITY SYSTEM AUDIT TRAIL

RELATED APPLICATION INFORMATION

This application is a continuation of U.S. patent application Ser. No. 08/893,973 filed Jul. 16, 1997 now abandoned, which is a file wrapper continuation under 37 C.F.R. 1.62 of U.S. patent application Ser. No. 08/384,771 filed Feb. 7, 1995 now abandoned.

BACKGROUND OF THE INVENTION

The invention relates generally to door security systems. More particularly, the present invention relates to electromagnetic locks which are automatically operable in response to electronic input signals.

In the field of building security, it is known to compile an electronic record or an audit trail to record the passage of an identified individual through a secured doorway or the presence of an individual at a checkpoint. Such an audit trail may provide user identification and a time and date stamp indicating when an authorized user enters or egresses through a particular doorway. The audit trail report may provide information for a particular doorway or building over a set period of time. Audit trails are typically used to retroactively monitor the times and dates that authorized users have operated a doorway lock or arrived at a given location.

For a door security system to provide an audit trail, the system typically requires an electrically operated lock, an electronic controller for the electrically operated lock, and an electronic reader to obtain user identification from a potential user to operate the lock and a power supply. Controllers are known that transmit user information to a remote centralized site for storage. The user identification and an associated time and date stamp are stored at that remote centralized site. At a later time, such audit information will be compiled to produce an audit trail report for a given individual, location and/or time frame.

SUMMARY OF THE INVENTION

Briefly stated, the invention in a preferred form is directed to a door security audit trail system which comprises an electrically controlled lock, an electronic reader to read user access codes, and a controller to automatically control the lock and an associated audit trail memory for storing audit trail information. The audit trail is a compilation of the information collected from the controller and is maintained in the vicinity of the lock.

The lock used in this invention may be of any type that employs a method of electrical control. Such locks include those with electric strikes, electromagnetic locks or electromechanical locks. The purpose of the electrically actuated lock is to secure a particular door from entrance or egress.

The electronic reader can comprise a key pad wherein a user enters a personal identification number (PIN), a card reader or an electronic key reader to receive an electronic key (TEK).

The controller electrically controls the lock. The controller has a capability of storing access codes that will allow opening the lock. Such access codes may be entered into the controller by means of the reader. The controller compares the access code information entered by the user to a prestored set of access codes. A correct match will result in a releasing of the lock mechanism. A mismatch may result in no releasing, an alarm or other preselected response.

Along with valid user codes, the controller may also store an access type for each user access code. Access types to a secured doorway may, for example, include continuous access, nighttime only access, daytime only access, the ability to toggle the type of access, a single use access, a lockout not allowing the user to enter but recording the attempted use, double key access or other types of access scenarios. An attempted entrance by a user authorized for access at one time but not another time can also be recorded in the controller.

The user access number and the time and date of the use of the door lock are stored in the audit trail memory for downloading to a computer at a future time.

In the preferred embodiment of the invention, the audit trail memory of the controller is also used to store other events beyond standard access recording. Such other events may include recording when the last audit trail information downloading was performed, recording when the door security system is initially powered up after a deactivation, recording release of the lock due to a fire alarm, recording invalid user attempts when the user has been deleted from the prestored access codes, recording when the lock out function has registered, recording when the door security system has been toggled between different access types, recording when the secured door is forced open overriding the lock, recording when the door is propped open, recording when the anti-tamper switch is activated on locks employing such devices, recording when the legal release key is used, recording when the delay egress cycle is initiated, recording when a force entry is attempted, or recording when that wrong key pad entries have been attempted. The audit trail memory of the controller records the time and date of each event and the type of event that has occurred.

A computer may also be provided to enter prestored access codes, access types and other response commands to the controller, and to download the audit trail from the audit trail memory. In a preferred embodiment, a plurality of doorways with electrically actuated locks are located in a given building. A portable computer is transported to each doorway to preprogram the valid user access codes, access criteria and response commands for each particular doorway. The computer may also be used to download and store the audit trail information from each particular audit trail memory. The audit trail information from each doorway could be displayed individually or as apart of an integrated audit trail report on the security of an entire building.

In the preferred embodiment, the computer would provide a transparent audit trail between the user access codes and the user names. The computer would have a prestored user list with the name and access code of every individual permitted to use the security system. When the audit trail was displayed, the user's name could be displayed along with or instead of the numerical access code or access number. A transparent system provides a readily understandable format for the monitoring of the security system.

The audit trail memory records the date and time of the latest update of the prestored user access codes and access parameters. The computer, when downloading the audit trail from the controller, compares the latest update user list to the user list stored at the controller. Should the lists not be equivalent, the computer will flag the audit trail to indicate that the controller was not updated concurrently with user access updating at the portable computer. The flagging alerts security personnel to determine whether unpermitted entrances have been made by unauthorized personnel during the period between the last and present update.

DETAILED DESCRIPTION OF THE PREFERRED EMBODIMENT

Figure 1:
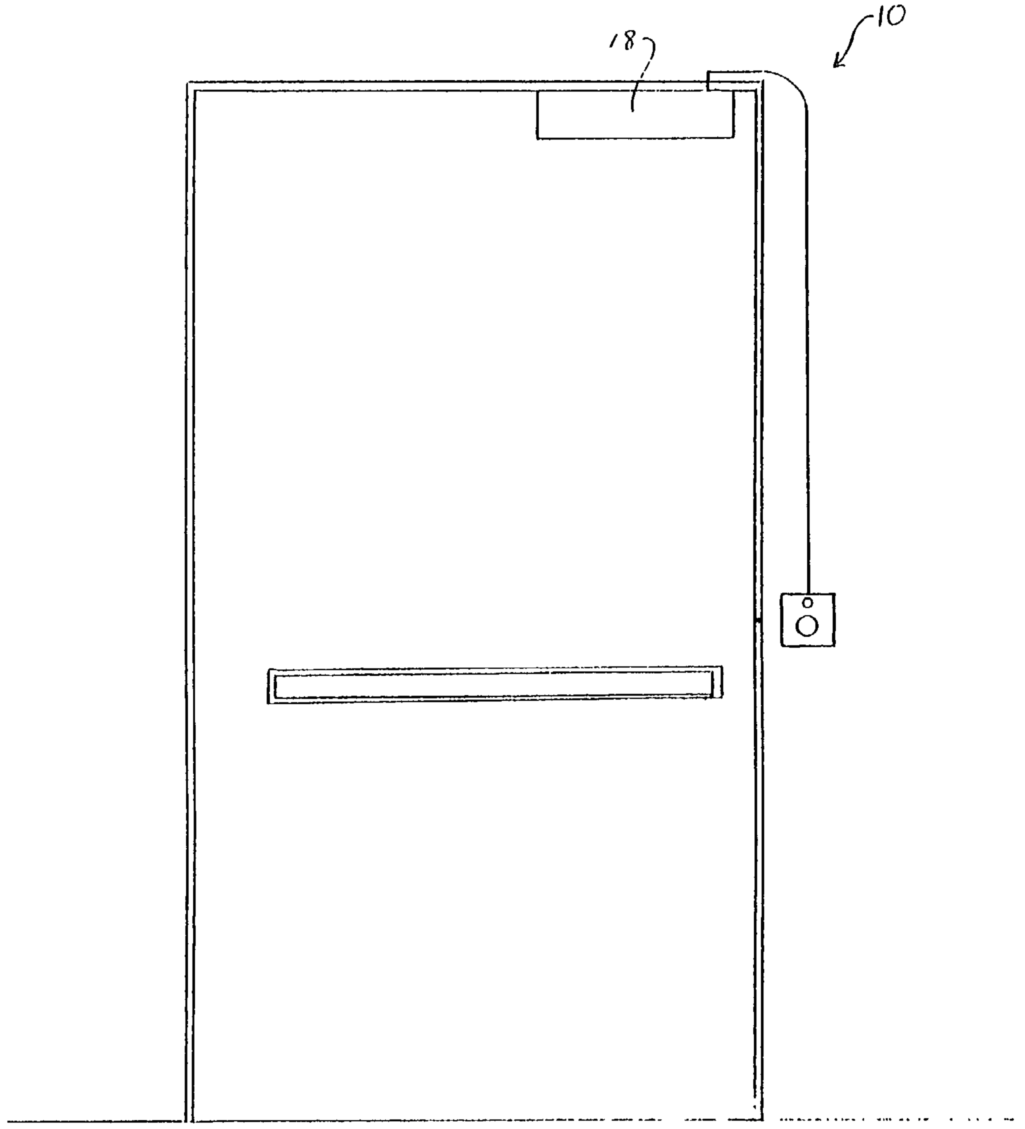
FIG. 1 is a schematic view of a doorway and door which utilize an electrically controlled lock and electronic key reader.

With reference to the drawings wherein like numerals represent like parts throughout the figures, a door security system in accordance with the present invention is generally designated by the numeral 10. The security system 10 generally comprises an electronic lock controller 11 having an associated audit trail memory 12. The controller controls an electrically driven lock mechanism 14. Such a lock mechanism 14 may preferably be an electromagnetic lock connected to the controller and audit trail memory 12 over a control line 16. In the system having an electromagnetic lock 14, the lock 14 is generally energized to maintain the door 20 in a locked state. The electrically driven lock could also consist of an electrically actuated mortise lock, an electrically driven latch, or some other form of electrically actuated lock. For some applications, the controller and associated audit trail memory may be located within the lock frame to create an audit lock assembly 18.

When the appropriate signal is received by the controller 11, the controller will send a release signal through line 16 to the electromagnetic lock 14 to thereby release the lock. The controller 11 may be responsive to input signals transmitted from numerous sources. In some systems, the controller may be responsive to a signal generated by the lock 14. Such a signal may be generated by the lock when the lock receives a force applied to the door from a particular direction. This may signal to the controller to initiate a delay timing sequence before allowing the door to open. A delayed timing event would be recorded by the audit trail memory 12.

The controller may also be responsive to a signal from a remote source such as a fire alarm signal over line 26. The fire signal would normally result in immediate release of the electromagnet 14. Line 26 can be simply connected to a fire alarm system or may preferably be connected to a computer system 28. The audit trail unit is adapted to record such an event.

The controller 11 also receives signals from the reader. The reader may be a card reader, a digital key pad for the reception of personal identification numbers, or a contact activatable key reader. A signal from the reader mechanism 22 is transported over a line 24 to the controller 11. In one embodiment, the reader 22 comprises both a contact activatable entry key reader and a key pad for the entry of a personal identification number.

The controller and audit trail memory is generally an integrated circuit system that is capable of running a computer program and storing information. The electronics of the controller serve to store user codes and record events at the doorway.

The controller is capable of running an audit trail program of the general flow pattern shown in FIGS. 12–15. The controller audit trail program 30 begins with a main program block 34. When a signal is received from the key reader 22 over line 24, the signal initiates the beginning of the controller lock program: The first step of the program is to perform standard scheduler 36. The scheduler notes the incoming command and the time. The incoming command may be in the form of a personal identification code, a key signal or other electronic entry information. The program next progresses to block 38.

At block 38, the main lock controller and audit trail program compares the incoming command to a list of valid access codes prestored in the controller memory. If the incoming signal represents a valid entry key when compared to the list of valid entry key codes, the program continues to the access code subroutine of block 40. If the signal does not represent a valid entry key, the program goes to second logic block 40 to compare the signal to valid key pad code entries, i.e., personal identification numbers (PINS), stored in the controller memory. If the signal matches a valid PIN code, the program progresses again to the access code subroutine 40. A command signal may be either a valid TEK code or valid PIN, but still not result in a lock release. The user may have a valid code, but the access is denied because the time is wrong for access or access is impermissible. If the signal does not match an input signal from either a valid key pad or an electronic entry key, the program progresses to logic step 42 where the program compares the incoming signal to prestored or pre-programmed serial retrieval or programming commands. If the signal is not a serial retrieval or programming command, the subroutine progresses back to the main menu 34.

If the code is not a valid entry key code, a valid key pad code, or an incoming serial retrieval or programming command, the main program reinitiates to receive another code and stores the entered incorrect code and the corresponding time in the audit trail memory. The audit trail memory may store each invalid attempt at access, or may keep a running total of invalid access attempts and record the total sum.

Finally, the memory may be programmed to indicate invalid attempts when the total exceeds a certain limit, such as 20 invalid codes. The totaling of incorrect entries may be preferred to reduce having to check accidental invalid inputs by users. A large number of invalid inputs indicates a systematic attempt to gain unauthorized access.

If the incoming signal is a programming serial command, the program progresses to block 44, and to the programming command subroutine of block 45. If the serial command is a retrieval serial command, the program progresses to the audit data subroutine of block 48. Again, if the command is neither a programming command nor a retrieval command, the subroutine returns to the main menu.

Figure 13:
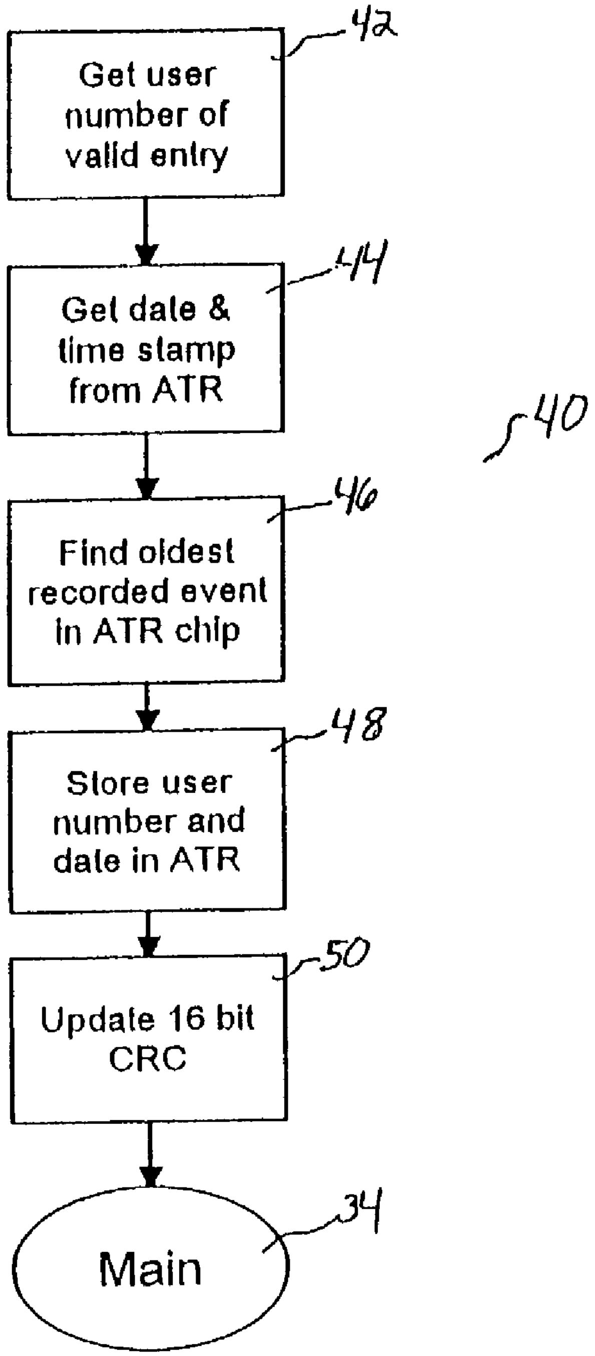
FIG. 13 is a flow chart for the access code subroutine of the main lock controller and audit trail program of FIG. 12.

Entry of a valid entry key code or PIN code begins the access code subroutine of block 40, generally shown in FIG. 13. At block 42, the subroutine retrieves the user number for a valid entry code. At block 44 the subroutine 40 generates a date and time stamp indicative of the time the valid access code was received by the controller. In the next step 46, the program finds the oldest recorded event in the audit trail recording chip and in step 48 stores the user access code and the date and time stamp in the audit trail memory after the oldest recorded event. Finally, the subroutine 40 updates the sixteen bit, cyclical redundancy check data error protection system before returning to the main menu 34.

The cyclic redundancy check is a method of data error detection. To facilitate error free data transfers, a DOW CRC-16 error detection system is preferred. Such a system can detect any odd number of errors, or double-bit errors within any data transfer. Additionally, the system can detect any clusters of errors contained within a 16-bit window or most large accumulated errors.

Figure 14:
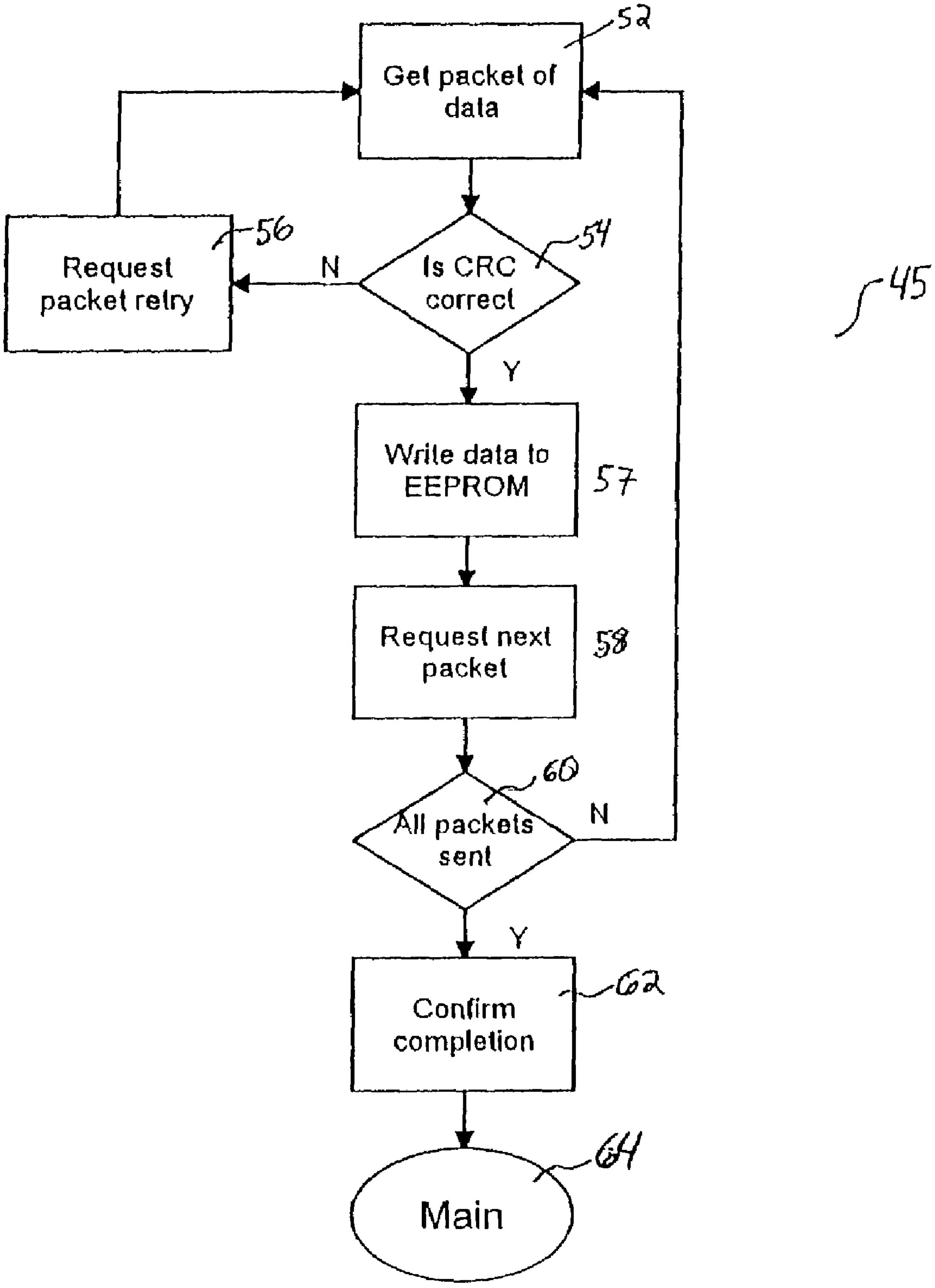
FIG. 14 is a flow chart for the programming subroutine of the main lock controller and audit trial program of FIG. 12.

The programming command subroutine 45, generally shown in FIG. 14, commenced with the received serial command signal 52. The serial command signal can be user access codes, access type commands and commands responsive to specific signals or codes. The subroutine 45 progresses to block 54 where the subroutine 45 performs a cyclic redundancy check on the serial command signal received. An incorrect signal results in the subroutine 45 returning to block 56 where the subroutine 45 requests a retry on the serial command signal. When the signal passes the cyclic redundancy test, the subroutine 45 at block 57 writes the signal to an electrically erasable programmable read-only memory chip (EEPROM). The EEPROM serves as the memory for the controller for prestored user access codes, access types and commands. The subroutine then proceeds at block 58 to request the next serial command signal. Next, the subroutine 45 at block 60 determines if all commands have been sent. If all commands have not been received by the controller, the subroutine cycles to block 52 until all the commands are received. If all the commands have been sent, the subroutine 45 progresses to block 62 where the program confirms completion of the command transfers and then returns to the main lock controller and audit trail program 34, therefore completing programming of the controller.

Figure 15:
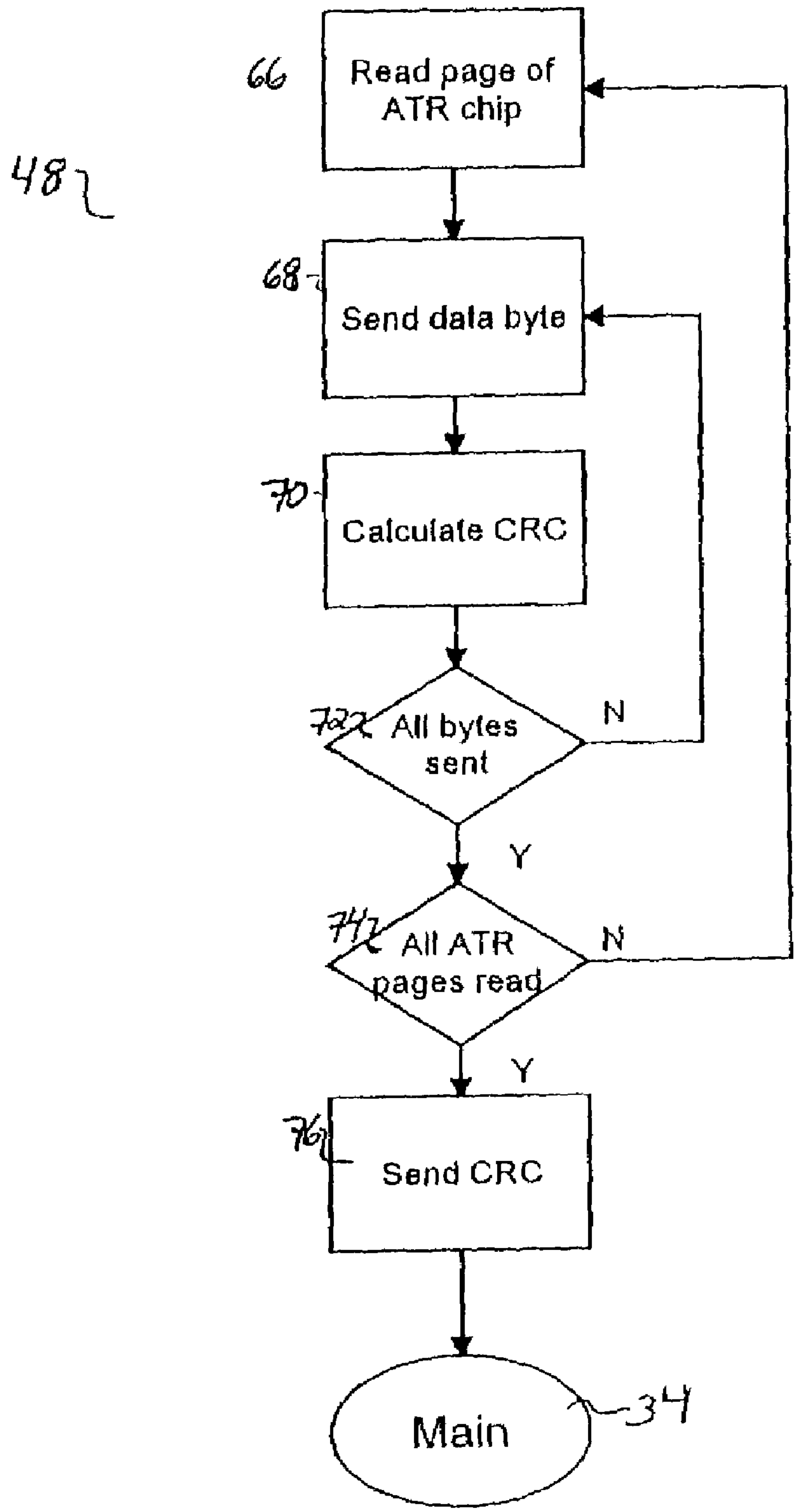
FIG. 15 is a flow chart for the command retrieval subroutine of the main lock controller and audit trail program of FIG. 12.

When the main lock controller and audit trail program 34 receives a command to retrieve information, the program employs the retrieval subroutine 48 generally shown in FIG. 15 to download the stored audit trail to a computer 28. The subroutine begins by reading a page of information from the audit trail memory in block 66. The subroutine 48 next sends a data byte of the audit trail page read in block 66 to a computer source connected externally to the controller in block 68. The data transfer can be connected to the computer 28 over data transmission line 26. The subroutine 48 next performs a cyclic redundancy check in block 70 to detect errors and confirms in block 72 whether all bytes of a data page have been sent to the remote computer. If all the bytes for a particular audit trail page have not been transferred to the remote computer system, the subroutine 48 returns to block 68 and continues to send data bytes. When all the bytes from a particular page of the audit trail report have been sent to the remote computer 28, the subroutine 48 progresses to block 74 to determine if all the pages of the requested audit trail report have been downloaded to the computer 28. If all the pages have not been downloaded, the subroutine 48 returns to block 66 to continue transferring audit trail pages of data. When all the requested audit trail pages have been downloaded, the subroutine 48 progresses to block 76 where the controller sends a cyclic redundancy check CRC to the computer to confirm that all data has been properly transferred without data error. Finally, the subroutine 48 returns to the main lock controller and audit trail program 34.

In the preferred embodiment of the invention, the remote computer 28 or 370 has the capability of programming the controller and associated audit trail memory of the door security system. The computer, operating a main audit trail program, can program the controller at the doorway to respond to signal inputs from the lock, the reader mechanism or an outside source. The controller then records and stores the user and access codes, events and associated times and dates in the audit trail memory.

The computer used to operate the main audit trail program 79 may be any of the number of types of personal computers including lap top or desk top machines. The main audit trail program is preferably DOS™ based, but could be just as successfully run in a Windows™-type environment. The computer serves to store and maintain all building information, door information, and user data lists comprising user names, group types, PINs, TEK data, access types and special comments. The computer also serves to upload data and commands, and to download audit trail data from individual lock controllers. Finally, the computer may be used to manipulate audit trail data.

Figure 2:
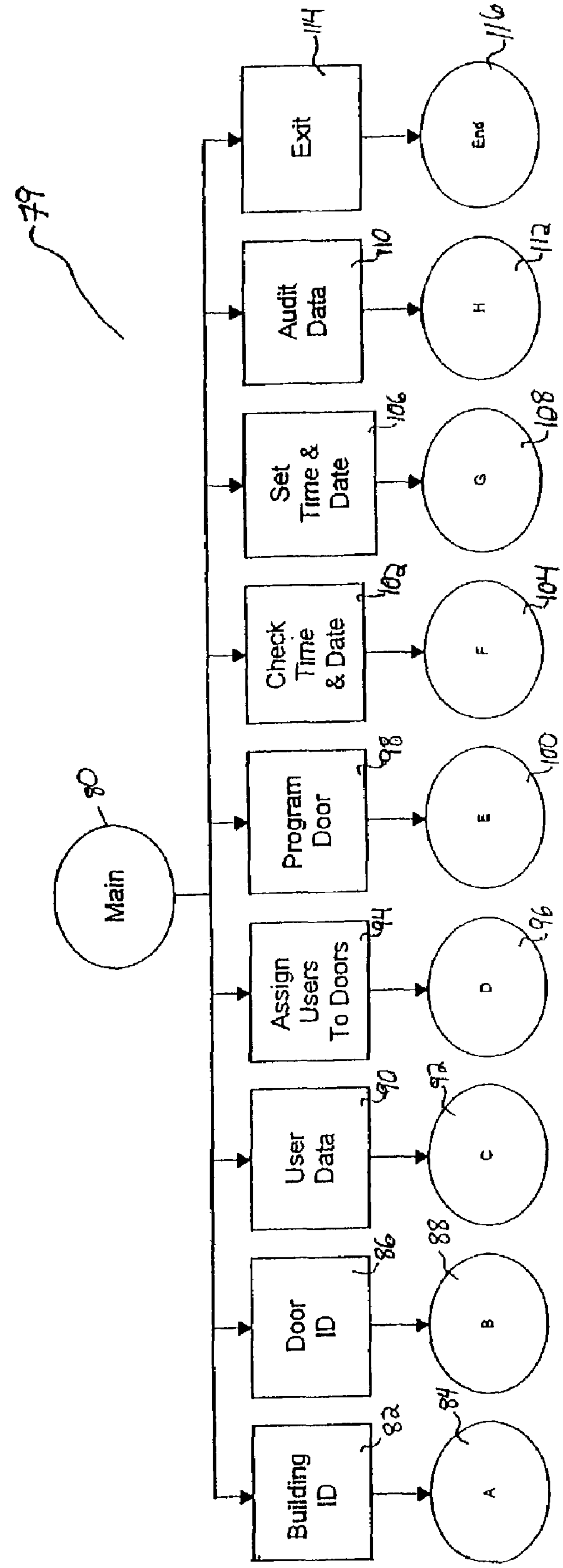
FIG. 2 is the main menu in schematic form for the main audit trail program.

The operation of the main audit trail program and included subroutines is demonstrated by FIGS. 2–11 showing, beginning with FIG. 2, the main menu 80 for the main audit trail program 79. The main menu 80 first gives a user the choice of checking building identifications in block 82, leading to a building ID subroutine 84.

Figure 3:
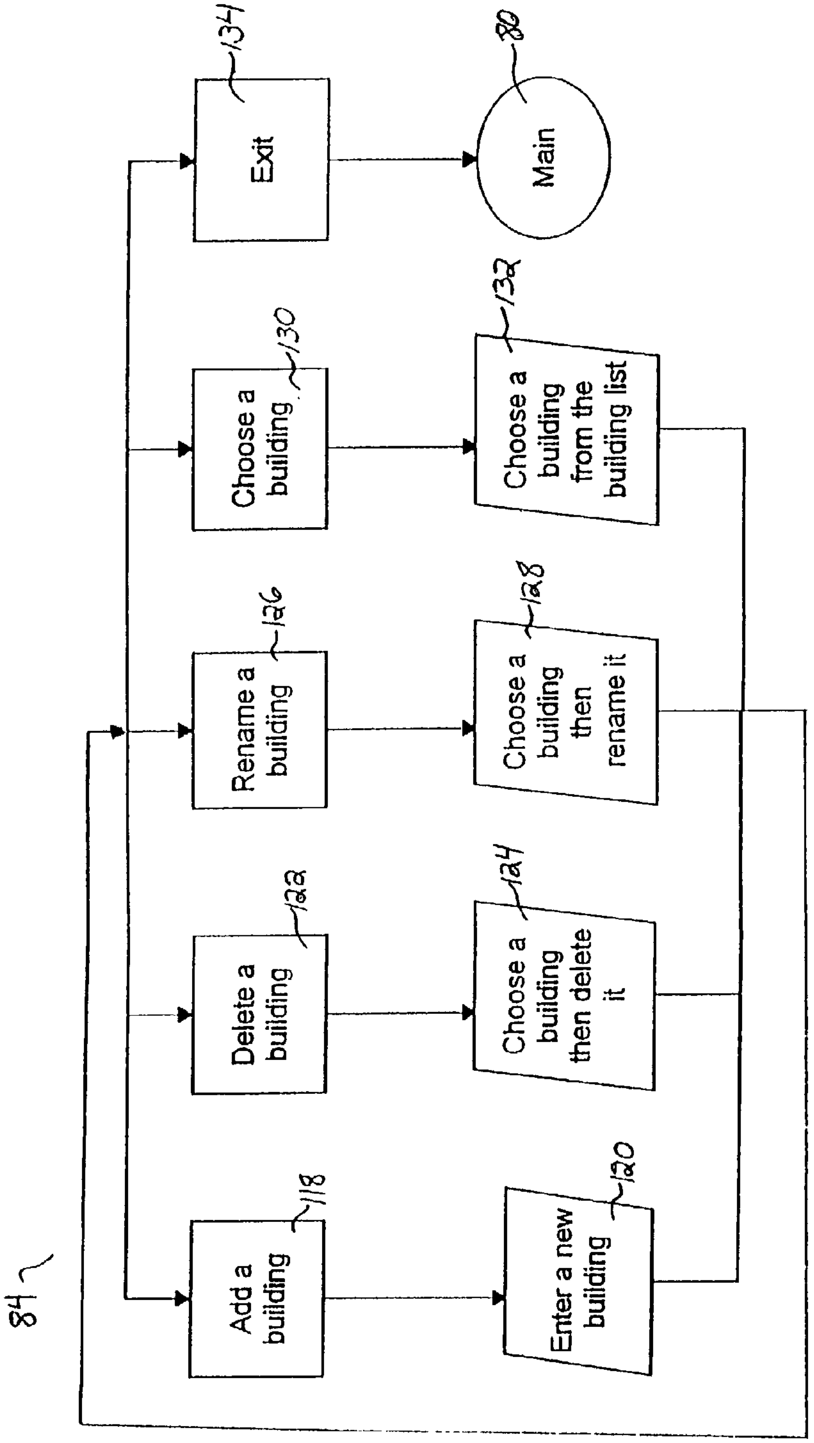
FIG. 3 is a flow chart of the building information subroutine of the main audit trail program of FIG. 2.

With reference to FIG. 3, the building identification subroutine 84 gives a computer operator the option of adding a building in block 118. When the operator chooses that option, the subroutine allows a computer operator to enter a new building to an already existing list of buildings in the computer. Block 122 is chosen when the operator chooses to delete a building. The subroutine 84 progresses to 124 where the operator has the option to delete a building from an already existing list of buildings stored in the computer, and then deletes the building from that list. The operator is given the option in block 126 of renaming a building. When this block is chosen, the program progresses to block 128 where the program allows the operator to choose a particular building already in the computer for renaming.

The user is additionally given an option to choose a building for view of all the information concerning that building in block 130. The program then progresses to block 132 to allow the user to choose a particular building from the already existing list of buildings in the computer. Such information would include users and access type data.

Subsequent to use of the blocks 120, 124, 128, 132, the subroutine allows the operator access to blocks 118, 122, 126 and 130 for continued manipulation of the building lists. When an operator has completed manipulating building information with the building identification subroutine 84, the operator chooses block 134 to exit the subroutine and return to the main audit trail menu 80.

Figure 4:
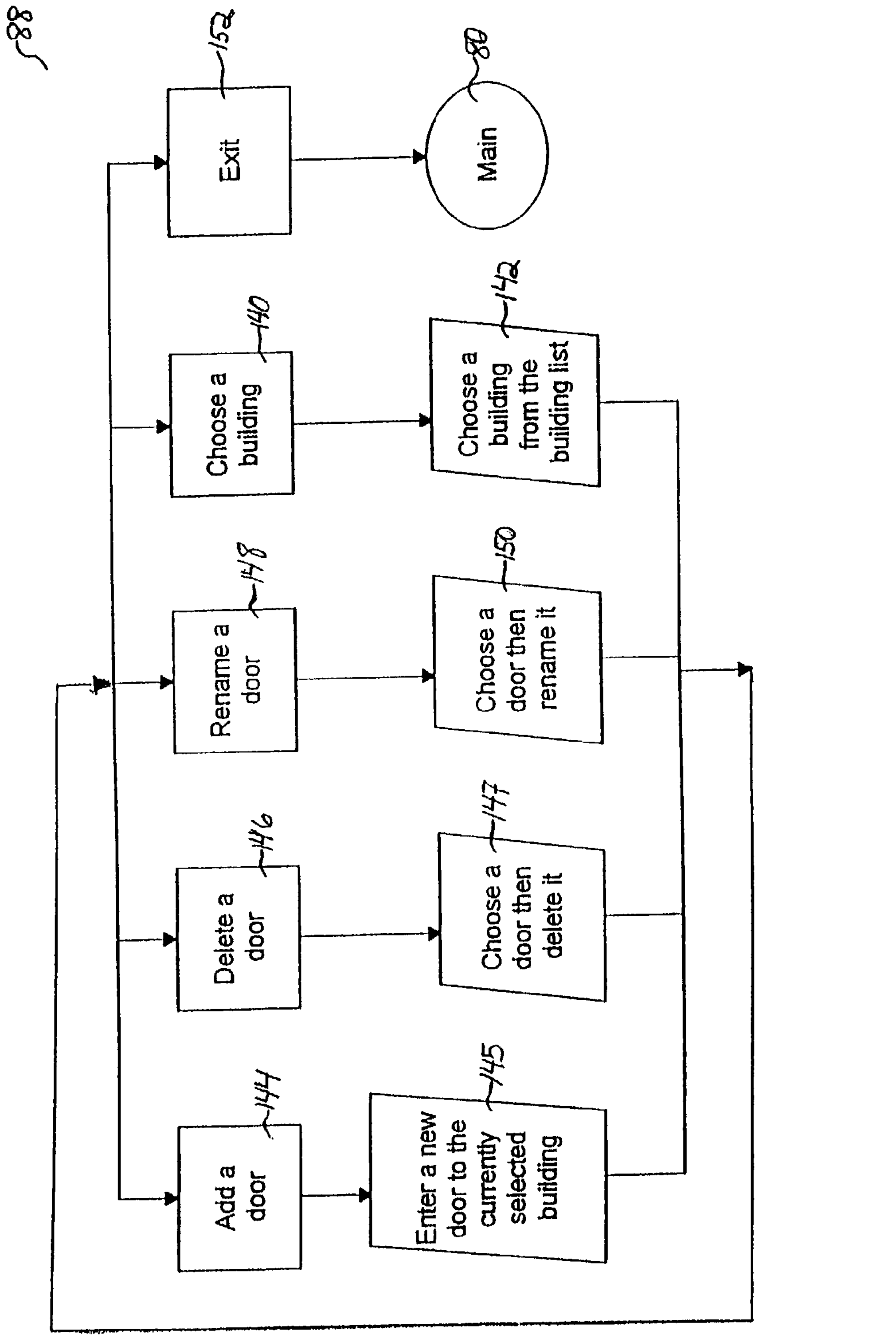
FIG. 4 is a flow chart of the door information subroutine of the main audit trail program of FIG. 2.
Figure 5:
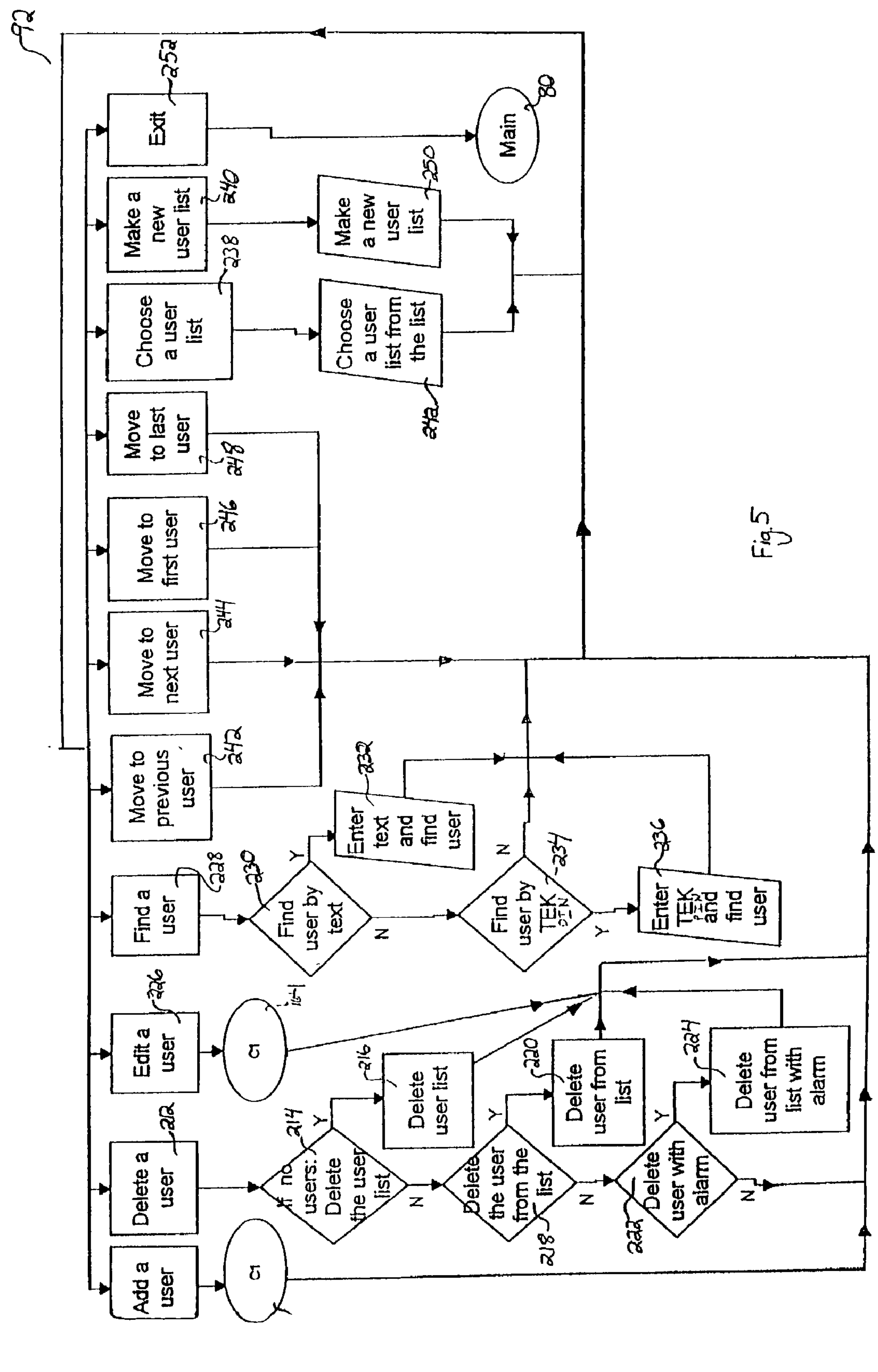
FIG. 5 is a flow chart of the user information subroutine of the main audit trail program of FIG. 2.
Figure 6:
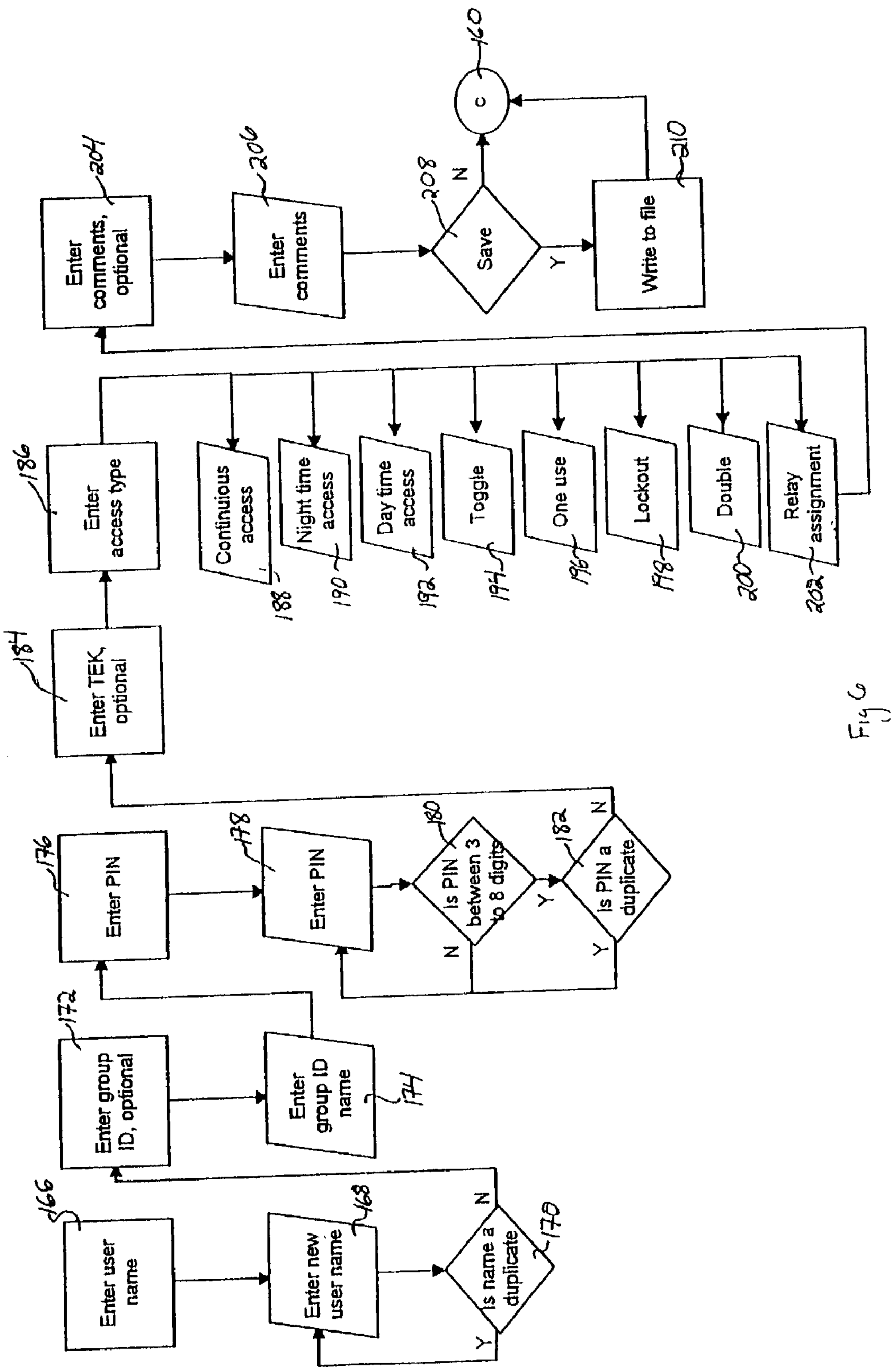
FIG. 6 is a flow chart of the user access code information subroutine of the main audit trail program of FIG. 2.
Figure 7:
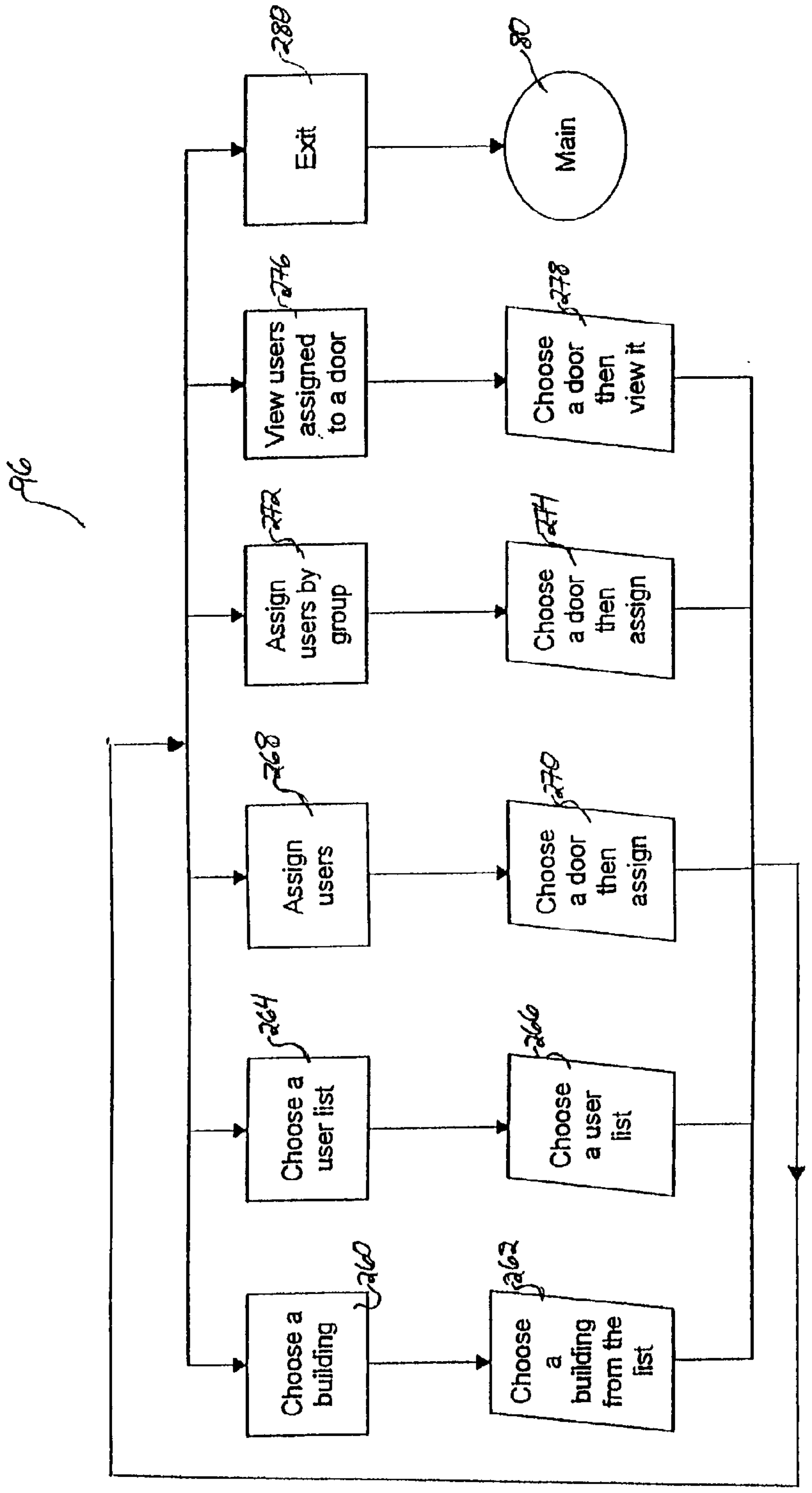
FIG. 7 is a flow chart of the user assignment information subroutine of the main audit trail program of FIG. 2.
Figure 8:
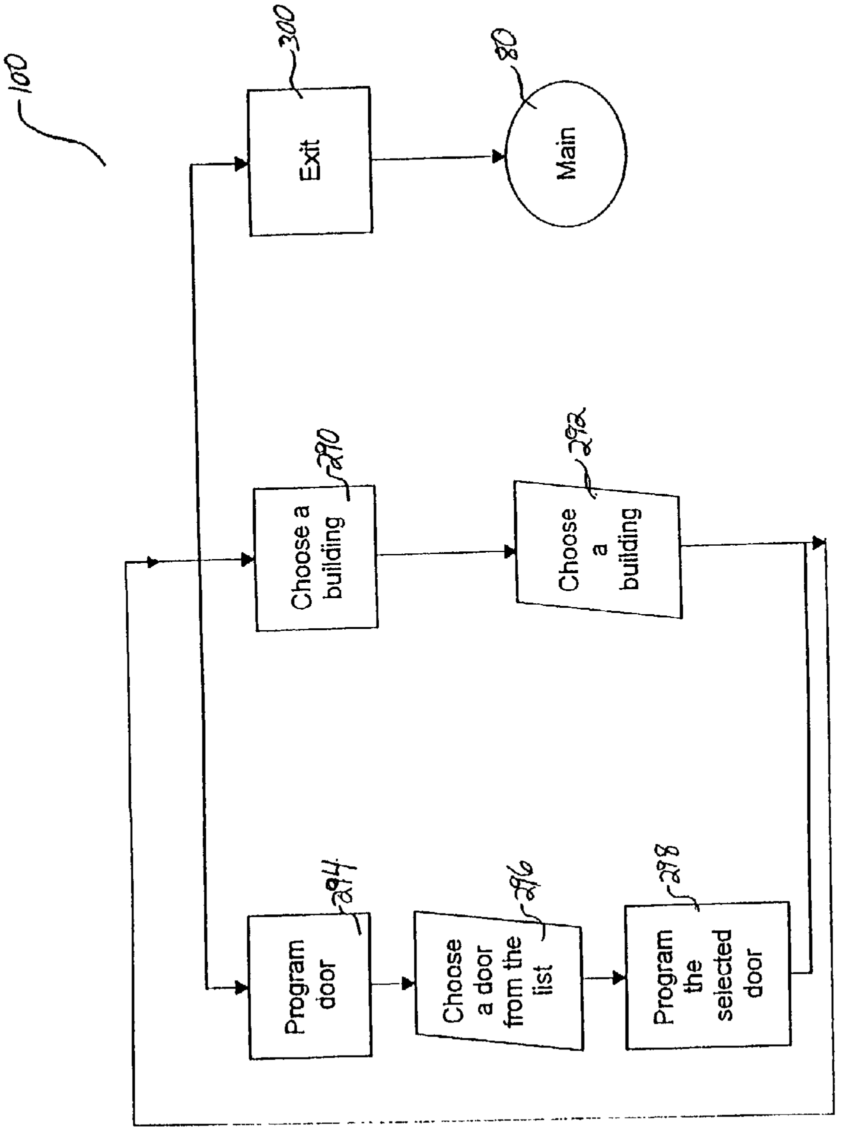
FIG. 8 is a flow chart of the door programming subroutine of the main audit trail program of FIG. 2.

From the main audit trail menu, the computer operator can edit door information by choosing block 86, leading to the door identification subroutine 88. The door identification subroutine 88 is generally shown in FIG. 4. In the door identification subroutine 88, the computer operator begins by choosing a building in block 140, from the prestored list of buildings in block 142. Having retrieved a building 142, the operator can change door data within the selected building. The subroutine 88 next allows the operator to add a door in block 144, delete a door in block 146 or rename a door in block 148. When the user chooses to add a door 144, the subroutine allows the operator to enter a new door, at block 145, to the currently selected building that was chosen in block 142. When the user deletes a door, the subroutine allows the user to delete a door at block 147 from the building chosen in block 142. Similarly, when the operator chooses to rename a door, a door from the building chosen in block 142 is renamed in block 150. When the operator is finished choosing new buildings and adding, deleting, or changing names of doors, the subroutine 88 allows the user to exit at block 152 to return to the main audit trail menu 80.

User data may be changed from the main audit trail menu 80 by selecting block 90 leading to data subroutine 92. The user data subroutine is generally described in FIG. 5. At block 162 the subroutine allows the operator to add a door user to the prestored door user list. Users are added to the add-users subroutine 164, generally shown in FIG. 6.

The add-users subroutine 164 begins in block 166 by allowing the operator to enter a user name. The subroutine 164 enters a new user name into an already existing file in block 168. The subroutine 164 next compares the new user name to a list of already existing names stored in the computer to determine if the new name is a duplicate of a pre-existing name. The subroutine returns to block 168 when a duplicate name is detected to allow the operator to enter an alternate new user name. If the name is not a duplicate, the subroutine 164 moves from block 170 to block 172 where the program operator may additionally add or change a group identification to correspond with a user name. In block 174, the group identification is entered to correspond with the user name. Then the program operator may enter a new or different personal identification number (PIN) for a user. The new or changed PIN is entered in block 178. The subroutine 180 determines if the new or changed PIN is between 3–8 digits. If the PIN is less than three digits or greater than eight digits, the subroutine returns to block 178 to allow the program operator to enter a new PIN number that is between 3–8 digits. If the PIN is between 3–8 digits, the subroutine continues from block 180 to block 182 to determine if the PIN is a duplicate of a PIN already stored in the computer's memory. If the PIN is a duplicate, again the program returns to block 178 to allow the computer operator to enter a new PIN that is not a duplicate. When the new or changed PIN entered by the operator meets both criteria, i.e., the PIN is between 3–8 digits and not a duplicate of preexisting PIN, the subroutine allows the computer operator in block 184 to enter an optional key (TEK) code to correspond to the user name.

Next, the subroutine in block 186 allows the operator to enter an access type. Access types are represented in blocks 188 to 200. Block 188 is chosen for continuous access which provides for access at any time. Blocks 190 and 192 allows more limited access, for example, access at night only in block 190, or only during the day in block 192. Even more limited access can be chosen in block 194, 196, 198 and 200. Toggle access in block 194 allows a maintained access until the access key or code is used again, thereby "toggling" the access back to a non-maintained status. Block 196 allows a single, one time access, before access is denied. Block 200 allows access when to individual, double only, keys or codes are entered simultaneously. The lockout access function of block 198 denies all other access until used again, returning the system to normal operation. Each access attempt during lockout is ignored and not recorded unless the user "deleted with alarm" attempting access. When a user "deleted with alarm attempts access, the audit trail can additionally sound an alarm at the door site or at a remote site. The program next progresses to block 202 for when a system employs specific controllers. Block 202 allows the user to choose either the auxiliary or main electromechanical relay to be activated when a valid TEK or code is entered. Next, the program allows the computer operator to enter comments for a particular user to the memory. Such comments could be displayed when the audit trail is compiled and displayed. The subroutine then enters the comments into the memory in block 206. The computer operator is then given the option of saving all the previously made additions and changes in block 208. If the computer operator chooses to save the additions and changes, the subroutine saves the user in block 210. Whether the computer operator chooses to save or not save the previously made additions and or changes, the add users subroutine 164 returns to the user subroutine 92 at block 162.

The computer operator may select a previously created user list in block 238 or choose to create a new user list in block 240. When the operator chooses a previously existing stored list, the operator has the option to choose a user list from the list given. The subroutine 92 then returns to the beginning of the subroutine.

Returning to FIG. 5, the user data subroutine 92 allows the computer operator to delete a user in block 212. First, the subroutine determines where there are any users stored in the computer memory. If no users are found at block 214, the operator is given the option in block 216 of deleting the entire user list. If there are users on the list in the computer memory, the subroutine goes to block 218 giving the computer operator the option of deleting a user from that list. The user may then be deleted in block 220 completely from the list or the user may be deleted with an alarm from the list in block 222. If the computer operator chooses to delete a user with alarm in block 224 the user is stored with an alarm next to that user's user access code. Depending on the construction of the door security system and the desired result, an alarm may sound at the door location, or result in an alarm at a remote security location. Whether the operator has chosen to delete the user from the list or delete a user with alarm or without alarm from the list, the subroutine returns to the beginning of the subroutine. The subroutine gives the computer operator the choice to edit a particular user. Such an edit may include giving a new PIN number, a new TEK number or other information about the user to change the access or any other user information in block 226. The subroutine then cycles to the add users subroutine 164 previously described in FIG. 6.

There may be circumstances when the computer operator needs to search for a particular user. The subroutine in block 228 allows the computer operator to search for a particular user from information related to that user. The user may be found by use of text in block 230. Text searches would generally be indexed by the user's name, but could also be indexed by user group or other text. If the computer operator chooses to find by user text, the operator enters the text and the computer searches the existing files for that particular text in block 232. The operator may also search the computer files by entering a user's key code or PIN number in block 234. In block 236, the subroutine searches the files by key number or PIN number to find the desired user. After either block 232, block 234, or block 236, the subroutine returns to the beginning of the subroutine. The program operator could next return to blocks 162 or 212 to add or delete a user from a list or to block 226 to edit a particular user. After having selected or created a user list in blocks 238 or 240, the computer operator can move within the retrieved or created list to find a particular user. Such movement is accomplished at block 242 by moving to a previous user on the list, or at block 244 by moving to the next user on the list. If there is a long list of users, and the operator wants to move quickly through the list, the operator at block 246 may choose to move to the first user on the list, or the last user on the list at block 248. After performing the function of blocks 242, 244, 246 or 248, the subroutine returns to the beginning of the subroutine.

The operator may choose to make a new user list in block 240. The program makes a new user list in block 250. The operator then returns to the beginning of subroutine 92. When the operator is finished finding users, adding users, deleting users or any other user-editor functions, the operator may exit the program through block 52 to return to the main menu 80.

The main menu 80 allows the computer operator to assign users to particular doors in door subroutine 96. The subroutine 96 allows the operator to assign users to a doorway in block 268. The subroutine 96 next moves to block 270 to allow the operator to choose a particular door to assign users. The subroutine also allows the operator in block 260 to choose a particular building. In block 262, the operator chooses a building from an already existing building list and allows the operator to assign a user to the particular building chosen. The operator may also choose in 264 a user list which allows the operator to pick a new user list to be used when assigning users. In block 266, the operator has the choice of the user lists in the computer memory. Then by moving to block 272 in the subroutine, the operator may assign that entire previously chosen list by group to a door in block 274. Additionally, the operator may view the users assigned to a door in block 276. In block 278, the operator is allowed to choose a particular door and view the previously assigned users of that chosen door. When the operator is finished assigning users to doors or viewing user lists for particular doors, the operator exits the subroutine at block 280 to return to the main menu 80.

Figure 16:
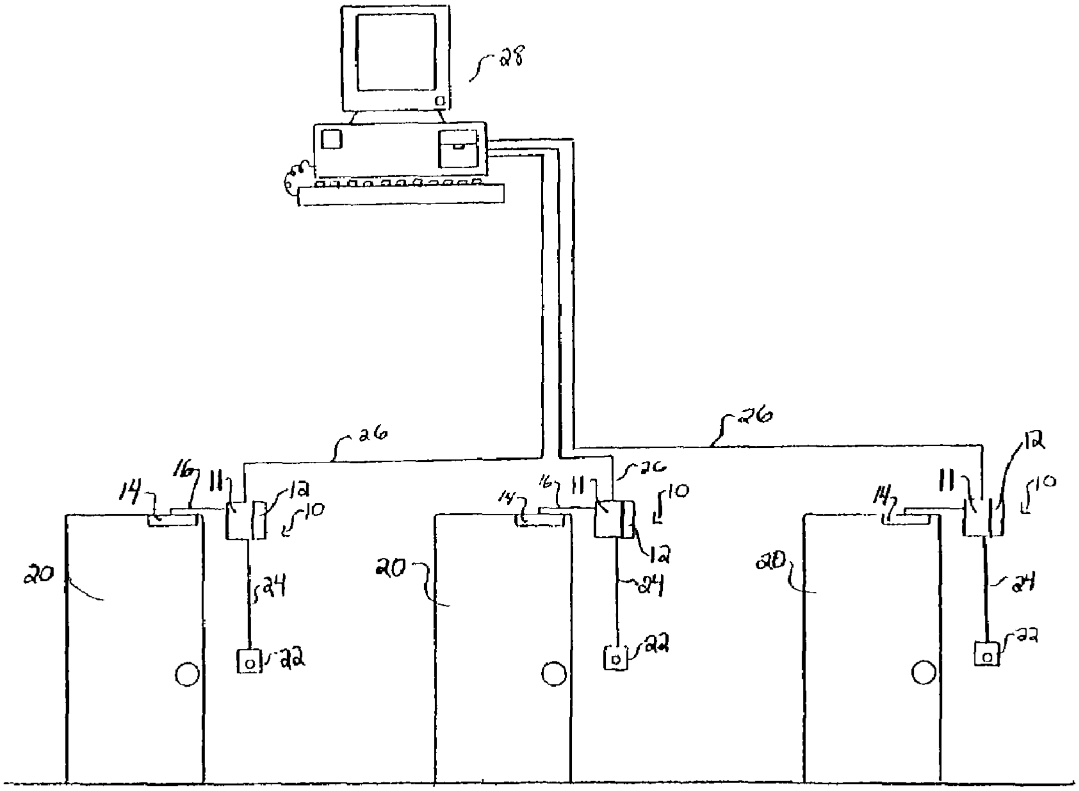
FIG. 16 is a schematic view of the door security system with a plurality of doorways, controller means, reader means and a computer electrically connected to the controllers.
Figure 17:
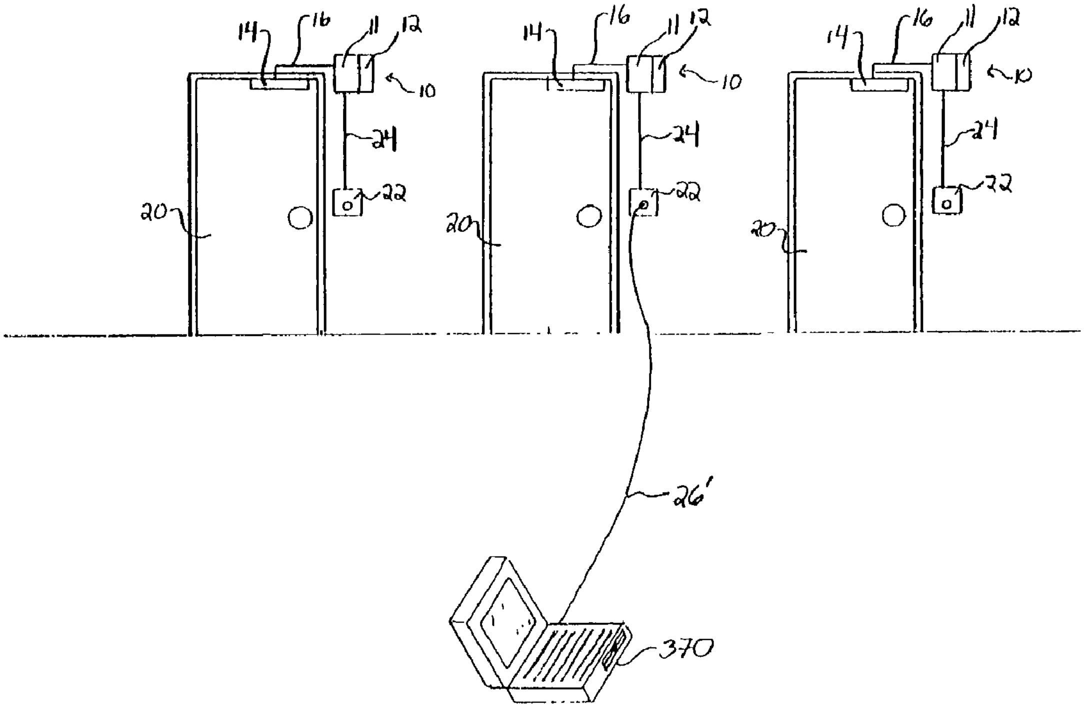
FIG. 17 is a schematic view of the door security system having a plurality of doors, controllers, reader devices and a portable computer system electrically connected to a single controller through a reader apparatus.

The main menu 80 allows the operator to program a particular door. Until this point in the main audit trail program, the program only received input data and commands from the computer operator. The next portions of the main audit trail program transmit commands and data to a controller operating the main lock controller and audit trail program previously described. The door controller may be programmed through a line 26, hardwired from the computer 28 to the controller 12 as shown in FIG. 16 or may be programmed by a portable computer 370 as shown in FIG. 17. The portable computer 370 may be carried to a particular doorway 20 and connected to the controller 12 at that particular doorway. The connection can be a temporary wire 26' which may be placed on the key pad 22 to transmit and receive data from the controller and associated audit trail memory 12 of that doorway 20 or by some other data transfer means such as a touch entry key reader, a phone jack or other wire connection.

The programmed door subroutine 100 begins by allowing the computer operator to choose a building from the computer files in block 290. In block 292, buildings stored in the program are displayed and the operator may choose a particular building. The program next allows the operator to return to block 294 to program a particular door of the building previously selected. All of the doorways for the chosen building are displayed in block 296. The operator may then choose a door to program from the building door list. The door may be programmed to allow access to users having valid TEK or PIN numbers. Additionally, the door may be programmed to allow the different types of access previously discussed. When the operator finishes programming all the necessary doors, the subroutine allows the operator in block 300 to exit and return to the main menu 80.

Figure 9:
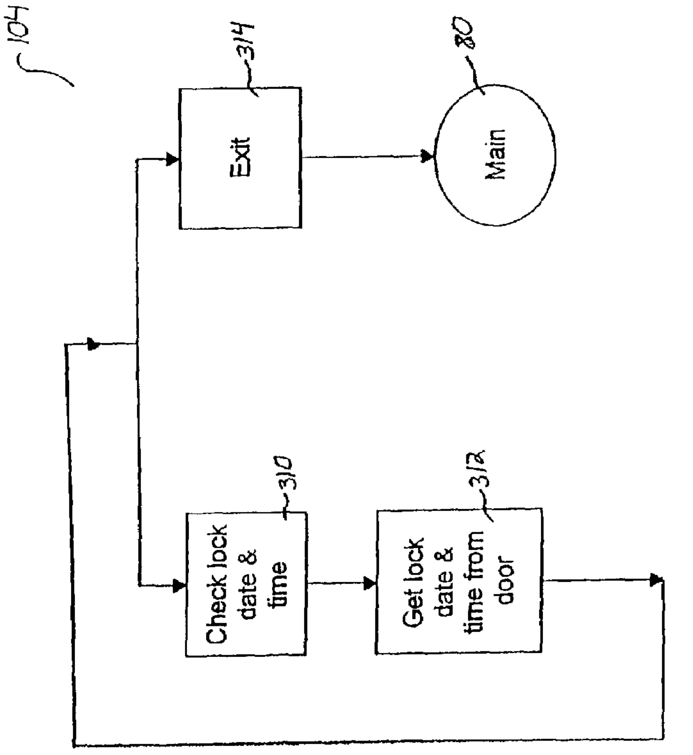
FIG. 9 is a flow chart of the check time and date subroutine of the main audit trail program of FIG. 2.

From the main menu 80, the date-time subroutine 104 allows the computer operator to check a lock date and time. The date-time subroutine 104 is generally shown in FIG. 9. The date-time subroutine 104 begins in block 310 by allowing the user to check the lock date and time from a particular doorway. In block 312, the user may get lock and date time for the selected door, by one of the methods previously described, such as over a data transfer line 26 or 26'. When the computer operator is finished checking all the dates and times of particular doorways, the program allows the operator to exit in block 314 to return to the main menu 80.

Figure 10:
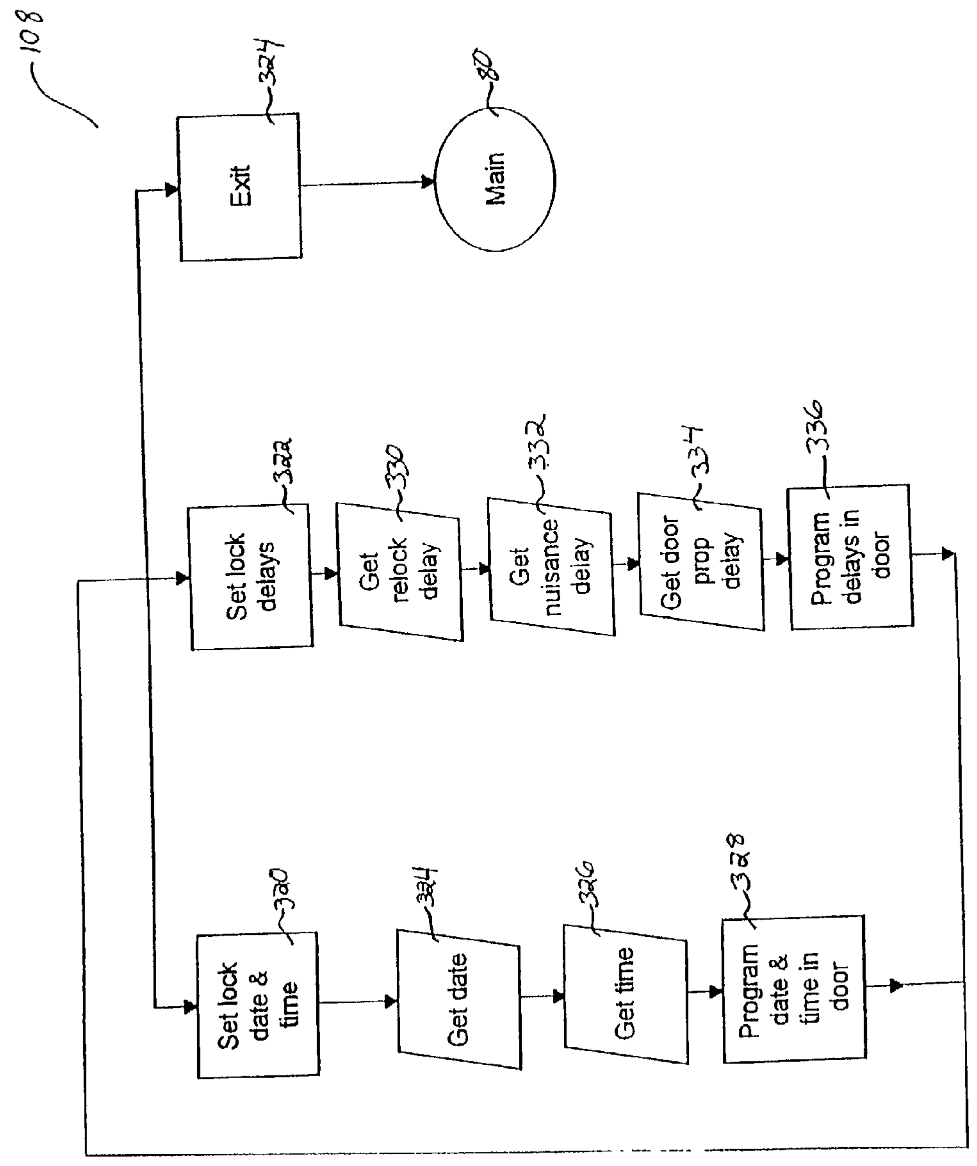
FIG. 10 is a flow chart of the set time, date and delay subroutine of the main audit trail program of FIG. 2.

Lock dates and times may be set from the main menu 80 by choosing block 106. The set date-time subroutine 108 is generally shown in FIG. 10. The subroutine gives the operator the option of setting particular locks date and time in block 320, setting the lock delays for a particular lock in 322 or exiting back to the main menu in block 324. When the operator chooses to set a lock date and time, the subroutine retrieves the date in block 324 and retrieves the time in block 326. Next, the subroutine allows the operator in block 328 to program the particular date and time into the controller of a door lock. This date and time information is stored in the audit trail memory for timekeeping purposes. When audit trail data is later downloaded, time is used for time stamping each valid access or event.

The lock delay of block 330 can be used to delay lock engagement until a period of time passes to allow a user to clear the doorway. When the operator chooses to set lock delays, the operator may set a relock delay in block 330, set a nuisance delay in block 332 or set a door prop delay in block 334. Nuisance delays of block 332 are used to delay egress through a particular doorway so as to allow security personnel to respond at the site of the doorway. Door prop delays of block 334 are employed to time how long a door remains open. When the door is open greater than the delay, for example 30 seconds, the controller will record in the audit trail that the door is propped open, and/or signal to a remote security site that building security is being compromised by a door propped open. The controller may also sound an alarm at the door site to warn the user that the door has been open longer than the preprogrammed delay.

After setting the desired delays, the program at block 336 transmits these delays into particular doorways. When the operator has finished setting lock dates and times and lock delays, the operator may exit at block 324 to the main menu 80.

Figure 11:
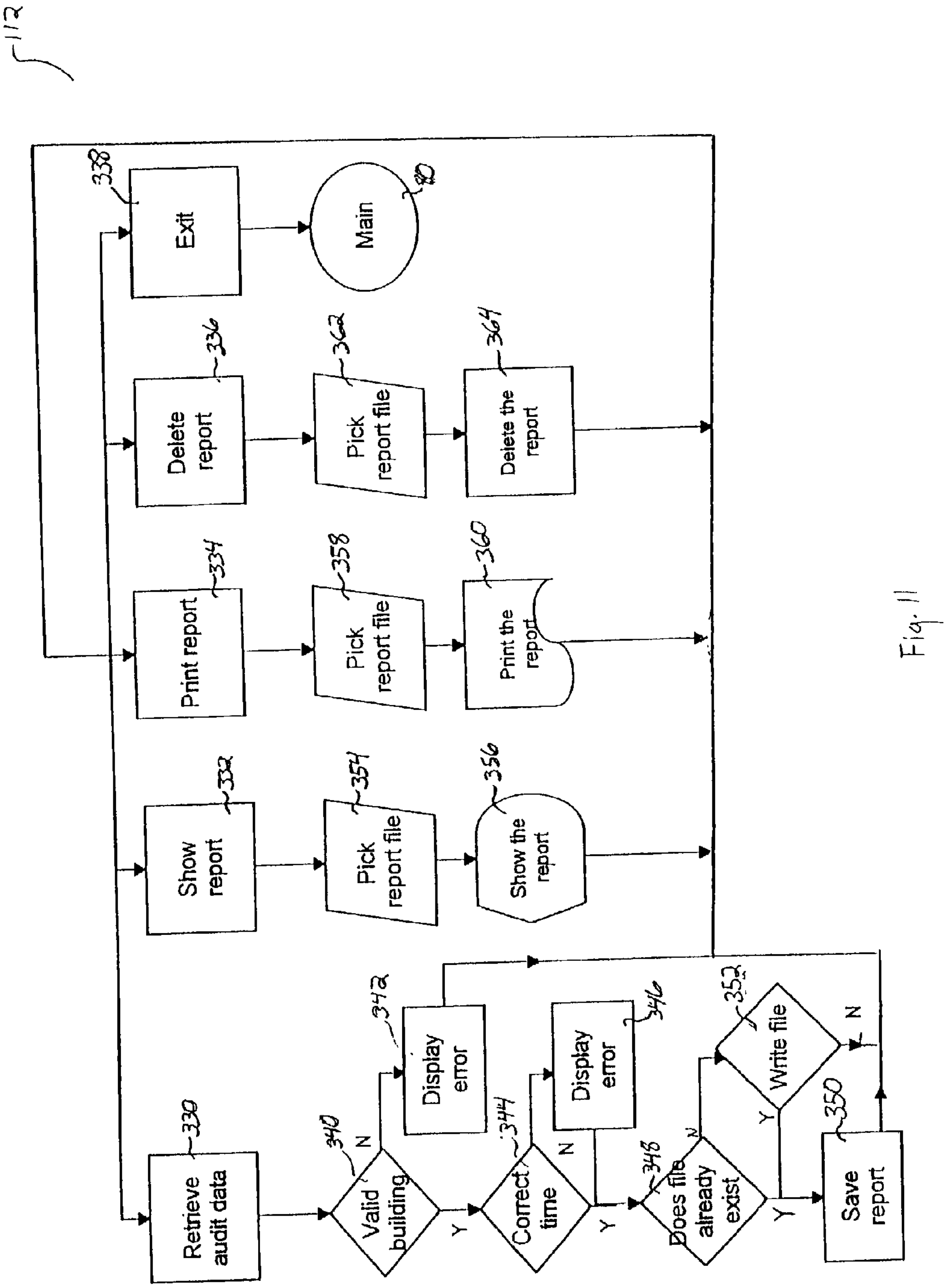
FIG. 11 is a flow chart of the audit data subroutine of the main audit trail program of FIG. 2.
Figure 12:
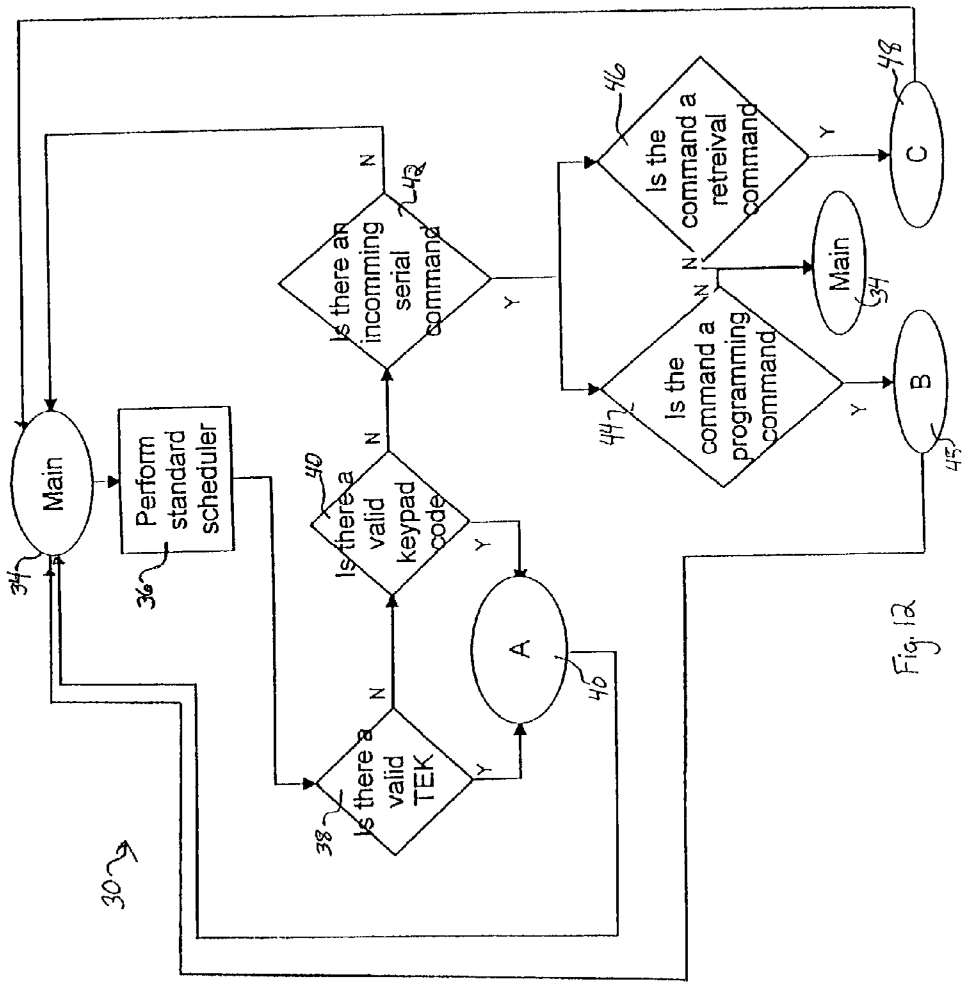
FIG. 12 is a flow chart for the main lock controller and audit trail program.

The audit data subroutine 112, which may be reached from block 110 of the main menu 80, is generally shown in FIG. 11. When the computer operator moves to the audit data subroutine 112, the operator is given the choice to retrieve audit data in block 330, to show an audit trail report in block 332, to print an audit trail report in block 334, to delete an audit trail report in block 336 or to exit the subroutine in block 338 back to the main menu 80.

When the operator wants to retrieve audit data by choosing block 330, the audit trail program determines whether a valid building has been entered into the computer from which the computer may retrieve from memory in block 340. If the building code is an invalid entry, the program displays an error indicator in block 342 and returns the user to the options of the subroutine 112. If the building code is valid, the subroutine at block 344 checks to see if the time is correct. An advantage of the preferred audit trail system is the ability of the computer to indicate that the computer has been updated to change particular buildings or doorways or access codes, and to indicate the time of the latest update of a particular controller. When there is a disparity between the updated information of a particular controller and the main computer, the computer will display an error sign indicating to the operator this disparity in block 346.

If the time is correct or incorrect, the subroutine next continues to determine whether a file already exists for a particular audit trail in block 345. If the file does not exist, the subroutine 112 continues and saves the report in block 350 if the file does not exist. If the file already exists, the subroutine 112 then saves the report in block 350 if the file does exist. If the file does not exist, the operator is given the option of writing a file in block 352 which would then be saved in the computer in block 350, or to continue the subroutine 112 and be returned to the options of the subroutine.

Should the operator choose to show a report, the subroutine in block 354 displays all the reports that the operator may choose from and then displays the chosen report in block 356. Similarly, if the operator chooses to print a report, all the stored reports are indicated in block 358 and the chosen report is printed at block 360. If a report needs to be deleted, again all reports in the computer memory are displayed at block 362 and a particular report chosen will then be deleted at block 364. When the operator has completed retrieving data, or showing, printing, and deleting reports, the operator may exit at block 338 back to the main menu 80.

While a preferred embodiment of the invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An electronic control system operable to control access to a plurality of doors by a plurality of users, the system comprising:

a plurality of door controllers, each door controller operable to control access to one of the plurality of doors and including memory, data storage, an input device, and a processor, each door controller storing the users identity and time of access within the data storage following each attempted access to the door; and a central computer including an input device, memory, data storage, and a processor, the central computer operable to program each of the door controllers individually and to program at least two door controllers simultaneously in a group in response to the addition or removal of a user, the computer connected to each of the door controllers and selectively communicating with at least one of the plurality of door controllers to facilitate data transfer therebetween.

2. The electronic control system of claim 1, further comprising an electromechanical lock actuatable by the door controller.

3. The electronic control system of claim 1, further comprising a plurality of programs, each program including a list of valid user codes, each door controller storing and running one of the programs, the program receiving a user code from the door controller input device and using the user code to determine whether a particular user is allowed access to the particular door.

4. The electronic control system of claim 3, wherein the program compares the input user code to the list of valid user codes stored within the door controller of the door being accessed to determine if access should be granted.

5. The electronic control system of claim 4, wherein the program calculates an access allowed time range and compares the time at which the user code is input to the range, and wherein access is denied when the time at which access is attempted falls outside of the access allowed range.

6. The electronic control system of claim 3, wherein the door controller input device includes a card reader.

7. The electronic control system of claim 1, wherein the data stored within each door controller includes an audit trail, and wherein the audit trail is downloadable to the central computer for review.

8. The electronic control system of claim 1, further comprising an electromagnetic lock actuatable by the door controller.

9. The electronic control system of claim 1, wherein the central computer is in data communication with each of the door controllers to transfer data therebetween.

10. An electronic door control system for a plurality of buildings, the system comprising:

a plurality of doors in each of the plurality of buildings, each door including an electrically actuatable lock mechanism;

a plurality of door controllers, each door controller operable to control access to one of the plurality of doors and including memory, data storage, an input device, and a processor, each door controller storing a user's code and time of access within the data storage following each attempted access to the door; and a central computer including an input device, memory, storage, and a processor, the central computer operable to program each of the door controllers individually and to program at least two door controllers simultaneously in a group in response to the addition or removal of a user, such that each controller alone controls access to its respective door.

11. The electronic control system of claim 10, wherein the electrically actuatable lock mechanism includes an electromechanical lock actuatable by the door controller.

12. The electronic control system of claim 10, further comprising a plurality of programs, each program including a list of valid user codes, each door controller storing and running one of the programs, the program receiving the user code from the door controller input device and using the user code to determine whether a particular user is allowed access to the particular door.

13. The electronic control system of claim 12, wherein the program compares the input user code to the list of valid user codes stored within the door controller of the door being accessed to determine if access should be granted.

14. The electronic control system of claim 13, wherein the program calculates an access allowed time range and compares the time at which the user code is input to the range, and wherein access is denied when the time at which access is attempted falls outside of the access allowed range.

15. The electronic control system of claim 12, wherein the door controller input device includes a card reader.

16. The electronic control system of claim 10, wherein the data stored within each door controller includes an audit trail, and wherein the audit trail is downloadable to the central computer for review.

17. The electronic control system of claim 10, further comprising an electromagnetic lock actuatable by the door controller.

18. The electronic control system of claim 10, wherein the central computer is in data communication with each of the door controllers to transfer data therebetween.

* * * * *

UNITED STATES PATENT AND TRADEMARK OFFICE

CERTIFICATE OF CORRECTION

PATENT NO. : 7,019,614 B2
APPLICATION NO. : 10/244999
DATED : March 28, 2006
INVENTOR(S) : Gary E. Lavelle and Peter S. Conklin It is certified that error appears in the above-identified patent and that said Letters Patent is hereby corrected as shown below:

On Title Page
In the Related U.S. Application Data

Item (63) Continuation of application No. 08/893,973, filed on Jul. 16, delete “2005” insert --1997--, now abandoned, which is a continuation of application No. 08/384,771, filed on Feb. 7, 1995, now abandoned.

Signed and Sealed this

Seventeenth Day of October, 2006

JON W. DUDAS
*Director of the United States Patent and Trademark Office*